Figure 4:
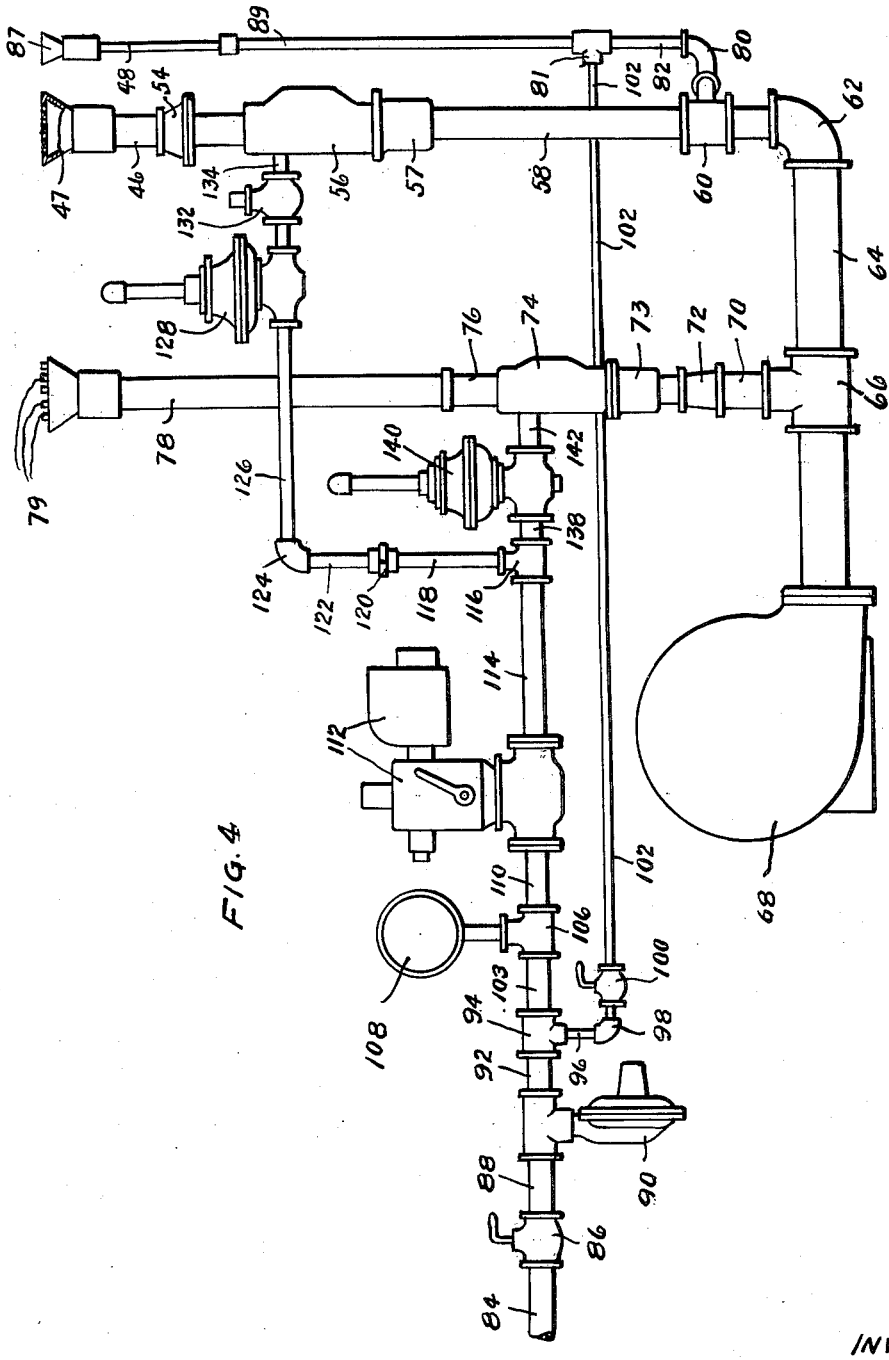

March 27, 1962   T. K. HUTCHINSON ET AL   3,026,584
MOLDING MACHINES
Filed Jan. 9, 1959   4 Sheets-Sheet 1
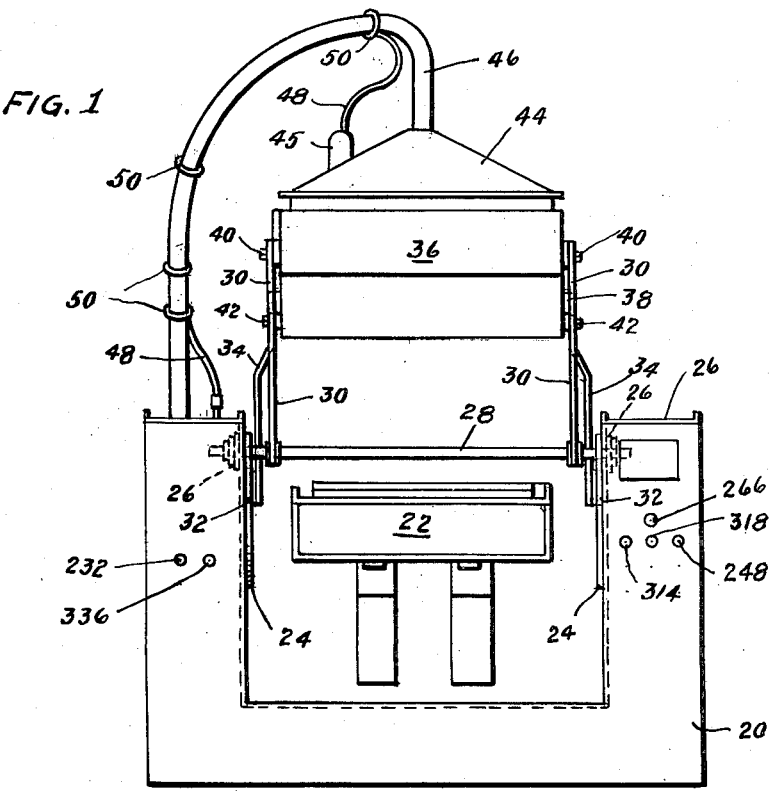
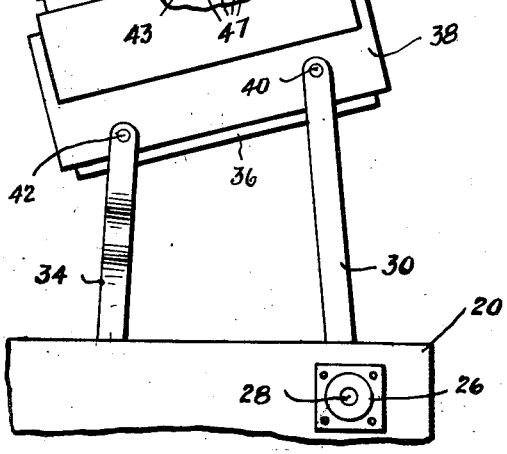
INVENTORS
THOMAS K. HUTCHINSON
OLIVER C. KEMP HUTCHINSON
BY Rey Eilers ATT'Y.

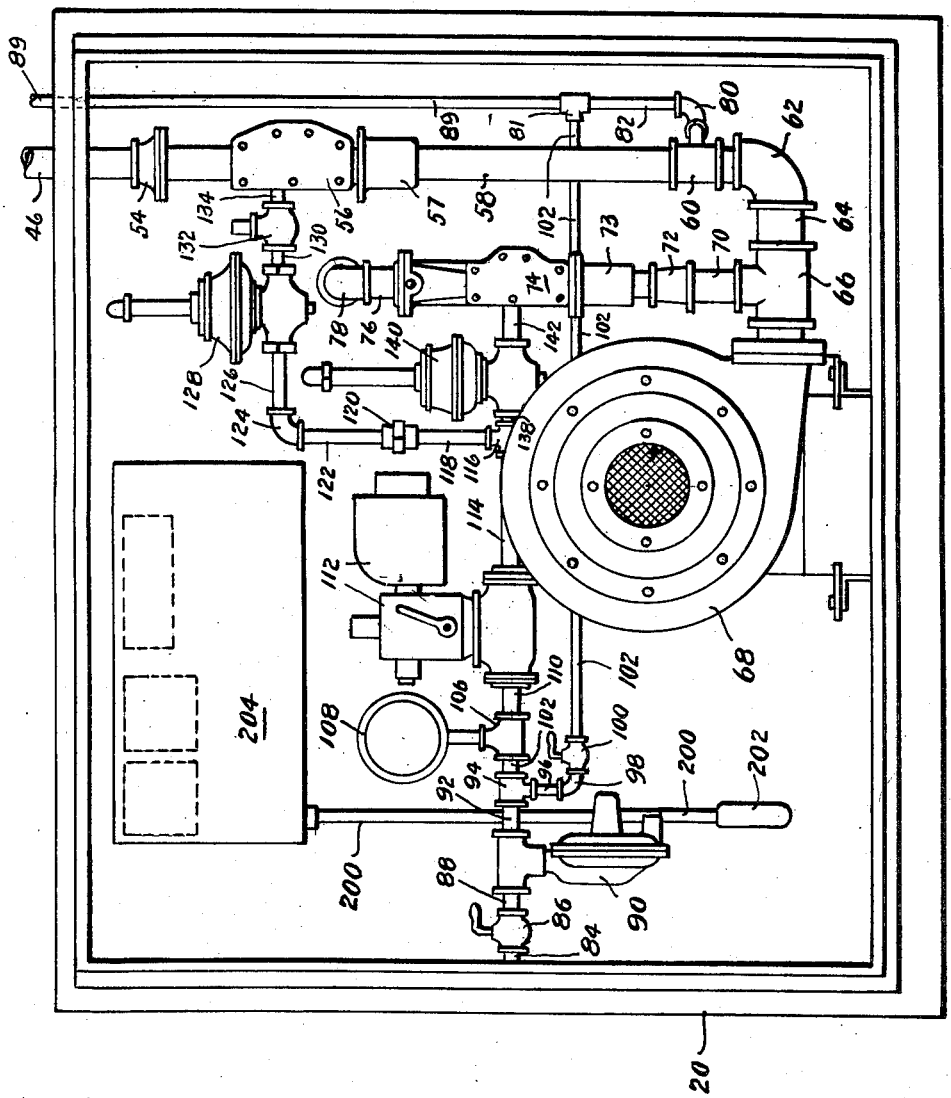

INVENTORS
THOMAS K. HUTCHINSON
OLIVER C. KEMP HUTCHINSON
BY Roy Eilers ATT'Y.

INVENTORS
THOMAS K. HUTCHINSON
OLIVER C. KEMP HUTCHINSON
BY  Rey Eilers  ATT'Y.

United States Patent Office 3,026,584
Patented Mar. 27, 1962

3,026,584
MOLDING MACHINES
Thomas K. Hutchinson, 926 Langdon, and Oliver C. Hutchinson, 311 Prospect, both of Alton, Ill.
Filed Jan. 9, 1959, Ser. No. 785,954
7 Claims. (Cl. 22—9)

This invention relates to improvements in molding machines. More particularly, this invention relates to improvements in molding machines that can form shell molds.

It is therefore an object of the present invention to provide an improved molding machine for making shell molds.

This invention is an improvement on the molding machine shown and described in our co-pending patent application Serial Number 575,418 which is entitled Molding Machines and which was filed April 2, 1956 and which was granted August 18, 1959, as Letters Patent No. 2,899,723. In that molding machine, a shell mold is formed on a heated pattern and then a heated oven is moved down adjacent that shell mold to supply heat that helps cure that shell mold. Thereafter, that heated oven is moved away from the shell mold to permit that mold to be stripped off of the heated pattern, and also to permit movement of the pattern-supporting frame and of the heated pattern. The molding machine disclosed in said co-pending application is very useful, and it forms good shell molds.

The present invention improves on that molding machine by providing a control system, for the movable oven, which supplies heat to that oven whenever that oven has been moved down adjacent the shell mold, and that cools that oven at all other times, as by blowing air through that oven. The present invention thus minimizes the amount of fuel used by the molding machine, and also minimizes the heating of the area surrounding the molding machine. The reduction in the amount of fuel used makes the molding machine of the present invention more economical to operate, and the reduced heating of the area surrounding the molding machine makes it more comfortable to operate the molding machine of the present invention. The cooling of the movable oven during those periods when it is not adjacent the shell mold also enables that oven to withstand more intensive heating, and thus makes it possible to cure the shell molds in shorter periods of time. It is therefore an object of the present invention to provide a control system, for the movable oven of a shell molding machine which supplies heat to that oven whenever that oven has been moved down adjacent the shell mold, and that cools that oven at all other times.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 5:
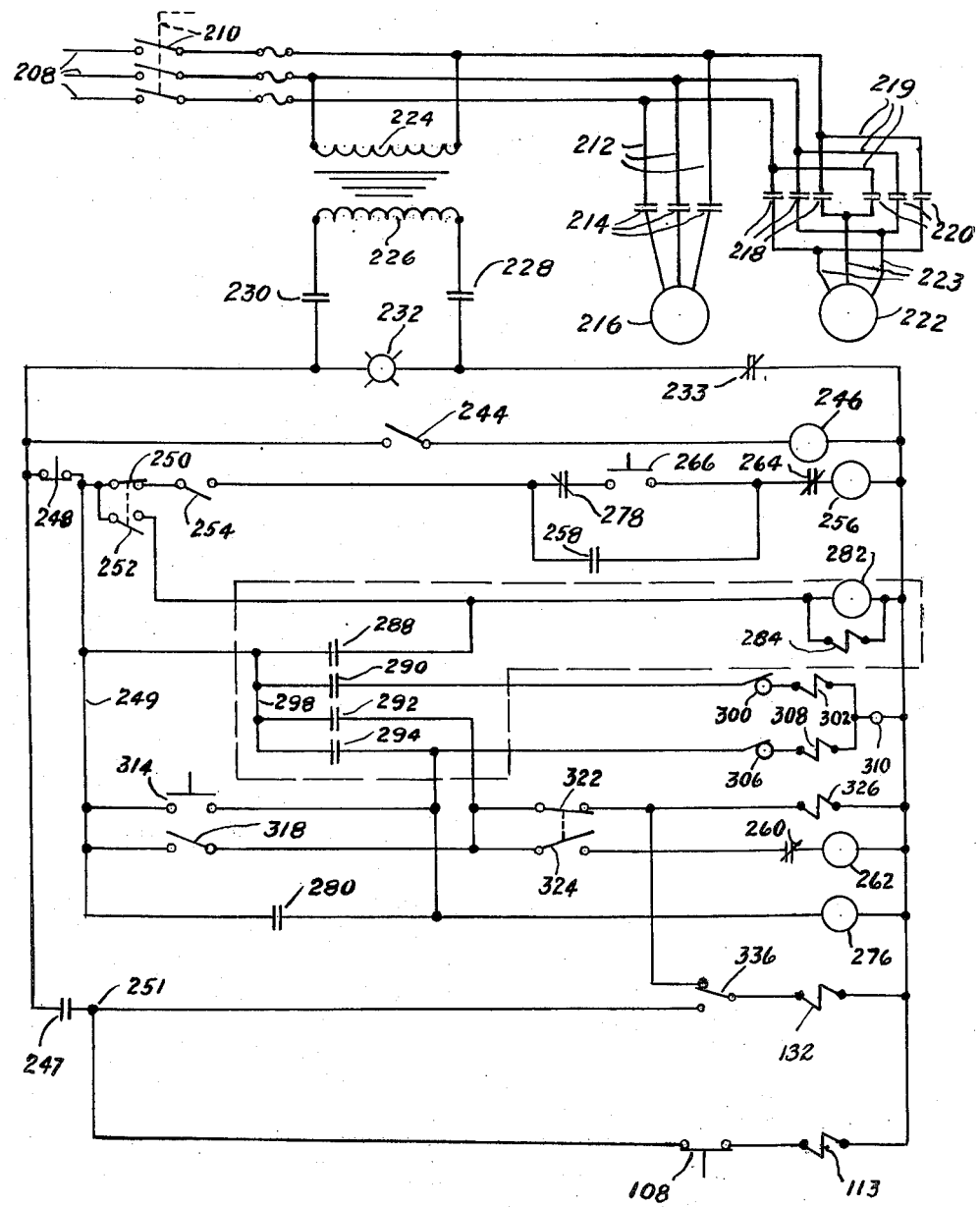

In the drawing,

FIG. 1 is a front elevational view of one embodiment of molding machine that is made in accordance with the principles and teachings of the present invention, FIG. 2 is an elevational view, on an enlarged scale, of the right-hand side of the upper part of the molding machine of FIG. 1, FIG. 3 is an elevational view, on a still larger scale, of the left-hand side of the lower part of the molding machine of FIG. 1, as that lower part appears when the inspection doors have been removed, FIG. 4 is a schematic diagram of the pipes and ducts for the heating gas and air for the molding machine of FIG. 1, and FIG. 5 is a schematic diagram of the electrical circuits of the molding machine of FIG. 1.

Referring to the drawing in detail, the numeral 20 denotes a U-shaped frame that is suitably fabricated from structural elements, and that is suitably covered with sheet metal. That frame has a recess in the left-hand side thereof which encloses the pipes and ducts for the heating gas and air, and also encloses the electrical controls for the molding machine. Inspection doors, not shown, normally close that recess and protect those pipes and ducts and those controls. The frame 20 has a recess in the right-hand side thereof which encloses the air cylinder, not shown, that moves the heated oven relative to the shell molds formed on the heated pattern of the molding machine; and that recess also encloses the motor for the pattern-supporting frame.

The numeral 22 denotes a pattern-supporting frame which is suitably mounted for rotation relative to the U-shaped frame 20. While that pattern-supporting frame can be mounted in different ways, the mounting, for the gas-heated pattern-supporting frame, that is shown and described in our co-pending patent application Serial Number 575,419 which is entitled Molding Machines and which was filed April 2, 1956, now abandoned, is very useful. Tracks 24 are mounted at the inner faces of the upstanding sides of the U-shaped frame 20, and those tracks suitably guide grooved wheels that facilitate the rotation of the sand-carrying container which applies sand to the heated pattern carried by the rotatable pattern-supporting frame 22.

The numeral 26 denotes bearing housings that are suitably mounted on the upstanding sides of the U-shaped frame 20, and those bearing housings rotatably support a shaft 28. An air cylinder, and spring, not shown, are housed in the recess in the right-hand side of the U-shaped frame 20, and that air cylinder and spring selectively rotate the shaft 28. Arms 30 are fixedly secured to the shaft 28, and those arms are disposed adjacent the opposite ends of that shaft. Pivot blocks 32 are secured to the inner faces of the upstanding sides of the U-shaped frame 20, and those pivot blocks rotatably support the lower ends of arms 34. The arms 34 are adjacent the front of the U-shaped frame 20, and the arms 30 are adjacent the rear of that frame. The arms 34 have offsets intermediate the ends thereof, so that the upper ends of the arms 34 are closer together than are the lower ends of those arms.

The upper ends of the arms 30 and 34 are disposed adjacent reinforcing side plates 38 of a movable oven 36. Pivots 40 are supported by the reinforcing side plates 38, and those pivots extend through openings in the upper ends of the arms 30. Pivots 42 are supported by the reinforcing side plates 38, and those pivots extend through openings in the upper ends of the arms 34. The pivots 40 and 42 enable the arms 30 and 34 to rotate relative to the oven 36; and they enable counter clockwise rotation of the shaft 28, as that shaft is viewed in FIG. 2, to rotate the arms 30 and 34 and move the oven 36 downwardly adjacent the shell molds formed on the pattern carried by the pattern-supporting frame 22. Clockwise rotation of that shaft will enable the arms 30 and 34 to return that oven to the raised position shown by FIGS. 1 and 2.

The oven 36 has a burner plate 43 therein, as shown particularly by FIG. 2, and a series of small holes 47 is provided in that plate. Those holes are arranged in rows; much in the manner of the holes in a continuous burner. Those holes serve as burners and they direct pre-mixed gas and air into the oven 36 to enable that gas and air to burn and provide an intense heat. A hood-like top 44 is provided for the oven 36; and that hood-like top receives one end of a flexible hose 46, and it will conduct pre-mixed gas and air from that flexible hose to the burners 47.

The numeral 45 denotes a housing which is mounted on the hood-like top 44 of the oven 36, and that housing carries the pilot nozzle 87 for the oven 36. A flexible hose 48 extends to the housing 45, and that hose will conduct pre-mixed gas and air to the pilot nozzle 87. The flame from that pilot nozzle will ignite the pre-mixed gas and air that will issue from the burners 47. A wire or other flexible element 50 extends around the hose 46 and around the flexible hose 48 to hold the hose 48 closely adjacent the hose 46.

Referring to FIG. 3, the other end of the hose 46 enters the upper right-hand corner of the recess in the left-hand side of the U-shaped frame 20, and it is attached to a coupling 54. That coupling is, in turn, secured to a mixing device 56 that pre-mixes air and gas. While a number of different mixing devices could be used, the Vari-Set mixer made by the Eclipse Fuel Engineering Company has been found to be very useful. A butterfly valve, that is supplied as a part of the mixing device 56, is denoted by the numeral 57. A pipe 58 extends downwardly from the butterfly valve 57 and is connected to a T-junction 60. A short nipple connects the lower end of the T-junction 60 with an L 62, and a short nipple 64 connects the left-hand end of that L with a T-junction 66. The left-hand end of the T-junction 66 is connected to the outlet of a centrifugal blower 68.

The other port of the T-junction 66 is connected to a nipple 70 which, in turn, is connected to a reducer 72. A short nipple extends upwardly from the upper end of the reducer 72 to a butterfly valve 73, which is generally similar to the butterfly valve 57. A mixing device 74, similar to the mixing device 56, is disposed above the butterfly valve 73; and a nipple 76 extends between the upper end of that mixing device and an L 78. That L is connected to a stationary fitting which is sealed to a rotatable chamber of the pattern-supporting frame 22; and that fitting and that rotatable chamber conduct pre-mixed air and gas to the burners 79 of the pattern-supporting frame 22 without any loss of gas or air. The burners 79 are located immediately below the pattern carried by the pattern-supporting frame 22, and they provide an adequate supply of heat for the pattern.

The numeral 80 denotes an L which is connected to the third port of the T-junction 60, and a pipe 82 extends upwardly from that L. A T-junction 81 is provided at the upper end of the pipe 82, and a pipe 89 is connected to the upper port of that T-junction. The upper end of the pipe 89 is connected to the lower end of the flexible hose 48.

The gas used in heating the pattern and oven of the molding machine provided by the present invention is supplied by a pipe, not shown, at the left-hand side of FIG. 3; and that pipe is suitably connected to a manually-operated shut-off valve 86 by a nipple 84. A nipple 88 extends from the outlet port of the valve 86 to a pressure regulating device 90 of standard form and construction. That regulator is intended to minimize variations in the pressure on the gas issuing from the outlet thereof. A nipple 92 extends from the pressure regulator 90 to a T-junction 94, and a nipple 96 extends downwardly from that T-junction to an L 98. A manually-operated, shut-off valve 100 is connected to the right-hand end of the L 98, and that valve supplies gas to an elongated, horizontally-directed pipe 102. The right-hand end of the pipe 102 is connected to the left-hand port of the T-junction 81; and that T-junction will admix the gas from pipe 102 with the air from pipe 82 and send the resulting premixed gas and air to the pilot nozzle 87 by way of the pipe 89 and the hose 48.

The numeral 103 denotes a nipple that extends from the other port of the T-junction 94, and that nipple extends to the inlet of a T-junction 106. A pressure-responsive switch 108 is connected to one of the ports of the T-junction 106, and that switch is normally intended to permit gas to flow to the burners 47 and 79, and it does so by normally energizing the solenoid 113 of a safety shut-off 112. However, that pressure-responsive switch can open, and thereby prevent flow of gas to the burners 47 and 79, as by de-energizing the solenoid 113 of the safety shut-off 112. That safety shut-off is of standard and usual construction, and it closes to prevent the flow of gas through it whenever its solenoid 113 is de-energized by the opening of the pressure-responsive switch 108 or by a power failure. Once it has closed, the safety shut-off 112 remains closed until its solenoid 113 is energized and its plunger is manually operated. The pressure-responsive switch 108 preferably is a C-437-B gas pressure switch made by the Minneapolis-Honeywell Regulator Company, and it preferably has a safety lockout that must be reset manually. The switch 108 will be closed as long as the gas pressure is normal, but it will open in the event the gas pressure surges. In opening at such times, and in locking itself open, the switch 108 keeps such gas pressure surges from blowing out the flames in the pattern-supporting frame 22 and in the oven 36 and then permitting un-ignited gas to fill that frame and that oven.

The inlet of the safety shut-off 112 is connected to the other port of the T-junction 106 by a nipple 110. The outlet of the safety shut-off 112 is connected to a T-junction 116 by a nipple 114. A nipple 118 extends upwardly from one of the ports of the T-junction 116, and the upper end of that nipple is connected to the lower part of a union 120. A nipple 122 extends upwardly from the upper part of the union 120, and that nipple extends to an L 124. A nipple 126 extends from the L 124 to a pressure-responsive valve 128. While a number of different pressure-responsive valves could be used, the Zero gas governor made by the Eclipse Fuel Engineering Company has been found to be very satisfactory. The outlet of the pressure-responsive valve 128 is connected to a solenoid-operated valve 132 by a nipple 130. The outlet of the valve 132 is connected to the gas inlet of the mixing device 56 by a nipple 134. The pressure-responsive valve 128 will normally be closed, but it will respond to reduced pressures at the outlet thereof to open and permit gas to flow to the mixing device 56. Such reduced pressures will be created whenever the blower 68 directs air through the mixing device 56.

The remaining port of the T-junction 116 receives a short nipple 138 which extends to a second pressure-responsive valve 140. The valves 128 and 140 are substantially identical. A nipple 142 connects the outlet of the pressure-responsive valve 140 to the gas inlet of the mixing device 74. The pressure-responsive valve 140 will normally be closed, but it will respond to reduced pressures at the outlet thereof to open and permit gas to flow to the mixing device 74. Such reduced pressures will be created whenever the blower 68 directs air through the mixing device 74.

The blower 68 supplies air to the mixing devices 56 and 74, and the amount of air supplied to those mixing devices is regulated by the settings of the butterfly valves 57 and 73. Because the oven 36 is intended to provide intensive heating of the shell mold for short periods of time, and is intended to be cooled by air from the hose 46 at all other times, the butterfly valve 57 will ordinarily be set in fully opened position. The blower 68 also supplies air to the pilot nozzle 87. Gas is supplied to the mixing device 56 by the solenoid-operated valve 132, and that gas will mix with the air supplied to that device and then pass to the burners 47. Gas is supplied to the mixing device 74 by the pressure-responsive valve 140, and that gas will mix with the air supplied to that device and then pass to the burners 79. Gas is supplied to the T-junction 81 by the valve 100 and the pipe 102; and that gas and the air from the pipe 82 will mix and pass to the pilot nozzle 87.

The pre-mixed air and gas issuing from the pilot nozzle 87 will be suitably ignited by a gas flame from a torch or wand, not shown, that can be held in the operator's hand; and once that pre-mixed gas and air is ignited, it will provide a continuous pilot flame. The mixture of gas and air issuing from the burners 79 will also be ignited by the gas flame issuing from the torch or wand in the operator's hand. Once that mixture has been ignited, it will burn continuously to heat the pattern. The mixture of gas and air that issues from the burners 47 of the oven 36 will automatically be ignited by the pilot flame from the pilot nozzle 87.

The numeral 200 in FIG. 3 denotes a length of conduit which extends upwardly from an L-shaped conduit fitting 202. The upper end of the length of conduit 200 extends into a housing 204 for the electrical controls used with the molding machine of the present invention. A source of power will be connected to those controls by leads 208 passing through the conduit 200 and through the conduit fitting 202. In the preferred embodiment of the present invention, those leads are the three leads of a four hundred and forty volt, sixty cycle source of alternating current.

A three pole, single throw, manually-operated disconnect switch 210 is connected to the three leads 208. That switch can be closed to supply current to the primary winding 224 of a step-down transformer, to three leads 212 that extend to contacts 214 controlled by a starter coil 246, to three contacts 218 controlled by a forward motor coil 256, and to three leads 219 that extend to contacts 220 controlled by a reverse motor coil 262. The contacts 218 are connected to the windings of an alternating current motor 222 in such a way that when they are closed they cause that motor to rotate its shaft in the forward direction, whereas the contacts 220 are connected to the windings of that motor in such a way that when they are closed they cause that motor to drive its shaft in the reverse direction. The motor 222 is equipped with a winding, not shown, which controls a brake that limits coasting of the motor shaft. That brake is applied whenever the contacts 218 or 220 are open, but it is held in released position by the said winding whenever the contacts 218 or 220 are closed.

The contacts 214 respond to energization of the starter coil 246 to energize an alternating current motor 216. That motor is suitably connected to the impeller shaft of the blower 68, and hence energization of that motor will operate that blower.

The numeral 226 denotes the secondary winding of the step-down transformer, and that winding will normally develop a voltage of about one hundred and fifteen volts. The normally-closed contacts 228 and 230 of an overload circuit breaker are connected to the terminals of the secondary winding 226. An indicating lamp 232 is connected to the lower contacts 228 and 230, and that lamp will indicate when the switch 210 is closed and the contacts 228 and 230 are closed. That lamp is mounted at the front face of the left-hand side of the U-shaped frame 20.

The numeral 233 denotes normally-closed overload contacts, and one of those contacts is connected to the lower contact 228. The contacts 233 are actually representative of the series-connected, normally-closed contacts of a number of overload devices; as for example, an overload device associated with the blower motor 216 and an overload device associated with the motor 222.

A single pole, single throw, manually-operated switch 244 and the starting coil 246 are connected in series between the lower contact 230 and the lower contact 228. In addition to the contacts 214, the starting coil 246 controls a pair of normally-open contacts 247; and that pair of contacts is shown adjacent the lower left-hand portion of FIG. 5. The left-hand contacts 247 is connected to the lower contact 230; and the other contact 247 is connected to a junction 251.

One terminal of a normally-closed push button 248 is connected to the lower contact 230, and the other terminal of that push button is connected to a common conductor 249. That push button is located at the front face of the right-hand side of the U-shaped frame 20.

Limit switches 250 and 252 have their left-hand terminals connected to the common conductor 249, and those limit switches are set so one of them is closed whenever the other is open. The switch 250 is closed and the switch 252 is open whenever the pattern-supporting frame 22 is in its normal, at-rest position; but the switch 250 will open and the switch 252 will close shortly before the sand-carrying container reaches its fully inverted position. The switch 250 will remain open and the switch 252 will remain closed as long as the sand-carrying container remains in its fully inverted position; but the switch 250 will re-close and the switch 252 will re-open shortly after the pattern-supporting frame 22 rotates the sand-carrying container out of its fully inverted position.

A switch 254 is connected to the right-hand terminal of the limit switch 250, and that switch is responsive to the position of the oven 36. The switch 254 is held in closed position whenever the oven 36 is in position adjacent a shell mold on the heated pattern carried by the pattern-supporting frame 22; and that switch is in open position whenever the oven 36 is in the raised position shown by FIGS. 1 and 2. The right-hand terminal of the switch 254 can be connected to the forward motor coil 256 through normally-closed contacts 278 of a relay 276 and normally-open push button 266 and normally-closed contacts 264 of the reverse motor coil 262, or through the normally-open contacts 258 of the forward motor coil 256 and the normally-closed contacts 264. The push button 266 is used to start cycles of operation of the molding machine, and the contacts 258 provide a holding circuit for the forward motor coil 256. The push button 266 is mounted on the front face of the right-hand side of the U-shaped frame 20. In addition to the normally-closed contacts 278, the relay 276 has a pair of normally-open contacts 280, and the left-hand contact 280 is connected to the lower end of the common conductor 249. In addition to the contacts 258, the forward motor coil 256 has a pair of normally-closed contacts 260; and those contacts are adjacent the reverse motor coil 262.

The right-hand terminal of the limit switch 252 is connected to the motor 282 of the timer used for the molding machine. While a number of different timers could be used, the Multiflex reset timer made by the Eagle Signal Corporation has proven to be useful. That timer has a clutch and has a winding 284 that can be energized to actuate that clutch. The clutch winding 284 is connected in parallel with its motor 282; and whenever that winding is de-energized, the clutch permits the contacts of the timer to reset themselves. That timer has four pairs of normally-open contacts 288, 290, 292 and 294; and the left-hand contact of each of those pairs of contacts is connected to a common conductor 298, and that common conductor is connected to the common conductor 249.

The right-hand contact 288 is connected between the limit switch 252 and the timer motor 282. The right-hand contact 290 is connected through a slip ring 300 to one terminal of the solenoid 302 of a solenoid-operated vibrator, not shown; and the other terminal of that solenoid is connected to the lower contact 228 by a slip ring 310 and contacts 233. The right-hand timer contact 294 is connected, by means of the slip ring 306, with one terminal of the solenoid 308 of a solenoid-operated air valve; and the other terminal of that solenoid is connected to the slip ring 310.

The slip rings 300, 306, 306 and 310 are mounted on, but are insulated from, the pivots for the pattern-supporting frame 22; and they conduct current to the electrical components carried by the pattern-supporting frame 22. One of those components is the solenoid-operated vibrator which has the solenoid 302, and that vibrator helps the mixture of sand and binder, which is deposited on the pattern by the sand-carrying container, conform closely to the surface of that pattern. Another of those components is the solenoid-operated air valve that has the solenoid 308, and that valve controls the flow of air to air cylinders, not shown, that raise stripper pins to strip the cured shell molds from the heated pattern. Those air cylinders and those stripper pins are carried by the pattern-supporting frame 22.

The right-hand timer contact 292 is connected to the left-hand terminals of limit switches 322 and 324. Those limit switches are responsive to the position of the pattern-supporting frame 22; and they are arranged so one is closed when the other is open. The limit switch 322 is closed and the switch 324 is open whenever the pattern-supporting frame 22 is in its normal, at-rest position; and the limit switch 322 is open and the switch 324 is closed at all other times.

The right-hand terminal of the limit switch 322 is connected to one terminal of a solenoid 326, and that solenoid is part of a solenoid-operated air valve that supplies air to the air cylinder which moves the oven 36 down adjacent a shell mold on the heated pattern carried by the pattern-supporting frame 22. The other terminal of the solenoid 326 is connected to the lower contact 228 by the contacts 233. The right-hand terminal of the limit switch 322 is also connected to the upper fixed contact of a single pole, double throw, manually-operated switch 336. That switch is mounted on the front face of the left-hand side of the U-shaped frame 20.

The right-hand terminal of the limit switch 324 is connected to the left-hand contact 260; and the right-hand contact 260 is connected to the left-hand terminal of the reverse motor coil 262. The other terminal of that reverse motor coil is connected to the lower contact 228 by the contacts 233.

The numeral 314 denotes a normally-open push button that has its left-hand contact connected to the common conductor 249. The right-hand contact of that push button is connected to the solenoid 308 and to the coil of the relay 276. That push button can be closed to energize that solenoid and that relay coil. That push button is mounted on the front face of the right-hand side of the U-shaped frame 20.

The numeral 318 denotes a single pole, single throw, manually-operated switch, and the left-hand terminal of that switch is connected to the common conductor 249. The right-hand terminal of that switch is connected to the left-hand terminals of the limit switches 322 and 324. The switch 318 is mounted on the front face of the right-hand side of the U-shaped frame 20.

The movable contact of the switch 336 is connected to one terminal of the solenoid of the solenoid-operated gas valve 132. The other terminal of that solenoid is connected to the lower contact 228 by the contacts 233. The lower fixed contact of the switch 336 is connected to the junction 251.

When the molding machine is not being operated, the electrical components of that molding machine will occupy the positions shown by FIG. 5. In preparing to use that molding machine, the operator first closes the disconnect switch 210; and if the indicating lamp 232 becomes illuminated, the operator will know that the switch 210, the fuses, the primary winding 224, the secondary winding 226, and the contacts 228 and 230 are all right. The switch 244 is then closed; and it will energize the starter coil 246. That coil will close the contacts 214 and 247. The closing of the contacts 214 energizes the motor 216 and causes the blower 68 to operate; and that blower will supply air to the burners 47 and 79 and to the pilot nozzle 87. The air passing to the burners 47 and 79 will pass through the mixing devices 56 and 74, respectively, and will thereby create reduced pressures at the outlet port of the solenoid-operated valve 132 and at the outlet port of the pressure-responsive valve 140. The reduced pressure at the outlet port of valve 140 will cause that valve to open; and the reduced pressure at the outlet port of valve 132 will, whenever that valve is opened, be applied to the outlet port of the pressure-responsive valve 128. The application of that reduced pressure to the outlet port of valve 128 will open that valve. The closing of the contacts 247 will energize the solenoid 113, but no gas can flow to the burners 47 and 79 until the lever of the safety shut-off valve 112 is manually operated.

The operator then opens the shut-off valves 86 and 100, and this permits gas to flow to the T-junction 81 at the upper end of the pipe 82. The resulting mixture of gas and air will issue from the pilot nozzle 87, and the operator will ignite that mixture with a gas flame from a manually-held torch or wand. At this time, the operator will push the lever of the safety shut-off valve 112, thereby opening that safety shut-off valve and permitting gas to flow to and through the valve 140. That gas will mix with the air in the mixing device 74 and pass to the burners 79. The resulting mixture will be ignited by a gas flame from the manually-held torch or wand; and the resulting flame will be continuous and will heat the pattern carried by the pattern-supporting frame 22.

The solenoid-operated valve 132 is still closed because the timer contacts 292 are open and because the switch 318 is open; but the operator can open that valve by moving the movable contact of the switch 336 down into engagement with its lower contact. The operator will usually open the valve 132 in this way at this time to make sure that the valve 132 is working properly, and also to make sure that the flame from the pilot nozzle 87 will ignite the mixture of gas and air issuing from the burners 47. Once he has made sure that energization of the valve 132 will produce a flame in the oven 36, the operator will move the movable contact of switch 336 back up into engagement with the upper contact of that switch. At such time, the solenoid of the solenoid-operated valve 132 will once again be de-energized.

The operator can wait until the flames from the burners 79 have raised the temperature of the pattern, carried by the pattern-supporting frame 22, to the desired level, or he can use the oven 36 to speed up the heating of that pattern. This is done by closing the switch 318, thereby energizing the solenoid 326 and the solenoid of the solenoid-operated valve 132. The resultant opening of the valve 132 establishes an intense flame in the oven 36, and the energization of the solenoid 326 enables the air cylinder to move the oven 36 down adjacent the pattern and help heat it. A pyrometer should be used by inexperienced operators; but experienced operators can usually gauge the temperature of the pattern without using a pyrometer. Once the desired pattern temperature has been attained, the operator will re-open the switch 318, thereby extinguishing the oven flame by de-energizing the solenoid of the solenoid-operated valve 132, and freeing the oven 36 for returning movement to its raised position by de-energizing the solenoid 326.

To start a cycle of the molding machine, the operator will press the push button 266; and thereupon the forward motor coil 256 will be energized by a circuit that extends from the lower contact 230, through the push button 248, through the limit switch 250, through the switch 254, through the relay contacts 278, through the push button 266, through the contacts 264, and then through the forward motor coil 256 and the contacts 233 to the lower contact 228. The switch 254 will be closed at this time because the air cylinder, not shown, freed the oven 36 for movement to its raised position; and the spring, not shown, returned that oven to that raised position. Only in the event the said air cylinder or the said spring has failed will be oven 36 remain adjacent the pattern, and thereby hold the switch 254 open; and it will be assumed that the said air cylinder and spring did not fail. Consequently, the pressing of push button 266 will energize the forward motor coil 256; and that motor coil will close the contacts 218, will close the contacts 258, and will open the contacts 260. The opening of the contacts 260 will prevent the simultaneous energization of the forward and reverse motor coils 256 and 262. The closing of the contacts 258 establishes a holding circuit for the forward motor coil 256; and the closing of the contacts 218 starts the shaft of the motor 222 rotating in the forward direction.

The shaft of the motor 222 will continue to rotate in the forward direction until the pattern-supporting frame 22 has rotated about three hundred and sixty degrees and has caused the sand-carrying container to move into inverted position atop the heated pattern carried by the pattern-supporting frame 22. Shortly after it began to rotate in the forward direction, the pattern-supporting frame 22 enabled the limit switches 322 and 324 to shift their positions; and after that pattern-supporting frame had rotated a total of about three hundred and thirty five degrees in the forward direction it caused the limit switches 250 and 252 to shift their positions.

The opening of the limit switch 250 will de-energize the forward motor coil 256; and thereupon the contacts 218 will re-open, the contacts 258 will re-open, and the contacts 260 will re-close. The re-opening of the contacts 218 will de-energize the motor 222 and will de-energize the winding 223 that holds the brake in released position; and thereupon that brake will move into holding position and limit coasting of the pattern-supporting frame 22 to about forty five degrees. The re-opening of the contacts 258 will break the holding circuit for the forward motor coil 256; and the re-closing of the contacts 260 will connect the reverse motor coil 262 with the right-hand terminal of the limit switch 324. However, the timer contacts 292 are open and hence the reverse motor coil 262 will not be energized at this time.

The opening of the limit switch 322 will not, at this time, have any effect because the timer contacts 292 are open and have been open. However, the closing of the limit switch 252 will energize the motor 282 and the clutch 284 of that timer. The energization of the timer motor and clutch 282 and 284, respectively, will immediately close the timer contacts 288 and 290; and this means that the timer contacts 288 and 290 will be closed before the pattern-supporting frame 22 reaches the end of its movement in the forward direction. As a result, the vibrator operated by the solenoid 302 will be vibrating the pattern before the pattern-supporting frame comes to rest; and therefore the sand and binder falling onto that pattern will be caused to conform closely to the surface of that pattern. The closing of the timer contacts 288 will establish a holding circuit for the timer motor 282 and for the timer clutch 284; and those contacts will remain closed long enough to enable all of the various operations of the molding machine to be completed. The timer contacts 290 will remain closed for just a few seconds, as for example four seconds, and will then re-open; thereby providing a short vibrating period for the pattern.

The timer contacts 292 will not close as soon as the contacts 288 and 290 close; but, instead, will remain open for a sufficient length of time, as for example ten seconds, to enable the heat from the heated pattern to soften enough of the binder in the admixed sand and binder, released to the heated pattern by the inverting of the sand-carrying container, to form a shell mold. That shell mold will be far from cured; but it will be sufficiently strong to retain its form and to adhere to the heated pattern as the pattern-supporting frame 22 rotates in the reverse direction. That rotation will occur when the timer contacts 292 do close, because those contacts will complete a circuit through the now-closed limit switch 324, the re-closed contacts 260, and the reverse motor coil 262. The completion of that circuit enables the reverse motor coil 262 to close the contacts 220 and to open the contacts 264. The closing of the contacts 220 will energize the motor 222 and its brake winding 223 in such a way that the shaft of the motor 222 will rotate in the reverse direction and will start the pattern-supporting frame 22 rotating back toward its normal, at-rest position. The opening of the contacts 264 prevents simultaneous energization of the forward and reverse motor coils 256 and 262.

At the time the timer contacts 292 completed the circuit through the reverse motor coil 262, those contacts could not complete a circuit through the solenoid of the solenoid-operated gas valve 132 because the limit switch 322 was open. However, as the pattern-supporting frame 22 returned to its normal, at-rest position, it caused the limit switches 322 and 324 to shift back to the positions shown by FIG. 5. Thereupon, the solenoid 326 and the solenoid of the solenoid-operated valve 132 became energized; and the gas released by the valve 132 passed to the oven 36 and was ignited by the pilot flame, and air was supplied to the air cylinder to move the oven 36 down adjacent the shell mold on the pattern. The resulting heat from the oven 36 will help cure the shell mold.

Shortly after the pattern-supporting frame 22 started back to its normal, at-rest position, the limit switch 250 re-closed and the limit switch 252 re-opened. The re-closing of the limit switch 250 did not have any effect at that time because the switch 254 opened when the oven 36 moved down adjacent the shell mold on the heated pattern, and also because the contacts 264 are open. The re-opening of the limit switch 252 had no effect at that time because the timer is holding its contacts 288 closed and is thereby maintaining a holding circuit for the timer motor 282 and the timer clutch 284. The re-opening of the limit switch 324 de-energized the reverse motor coil 262, thereby opening the contacts 220 and re-closing the contacts 264. The re-opening of the contacts 220 de-energized the motor 222 and its brake-releasing winding 223; and thereupon the shaft of the motor 222 came to rest. The re-closing of the contacts 264 had no effect at that time because the circuit of the forward motor coil 256 is still broken at the switch 254, at the push button 266 and at the contacts 258.

The solenoid 326 will continue to be energized, and the solenoid of the solenoid-operated valve 132 will continue to be energized, as long as the timer contacts 292 remain closed. The length of time during which the timer contacts 292 remain closed must be regulated in accordance with the heating value of the available gas, in accordance with the softening temperature of the binder, and in accordance with the desired thickness of the shell mold; but that length of time is easily determined. Usually that time will be between forty and forty-five seconds. When the timer does open its contacts 292, the solenoid 326 will become de-energized and the solenoid of the solenoid-operated valve 132 will become de-energized. The de-energization of the solenoid 326 of the air-operated valve will enable the spring, not shown, to return the oven 36 to its raised position; and as that oven reaches that position, the switch 254 will re-close. The de-energization of the solenoid of the solenoid-operated valve 132 will extinguish the flames from the burners 47. Consequently, as soon as the oven 36 starts moving upwardly toward its raised position, the flames from the burners 47 will become extinguished.

At the time the timer contacts 292 open, the timer contacts 294 will close; and the contacts 294 will energize the solenoid 308 of the solenoid-operated air valve which supplies air to the air cylinders controlling the stripper pins. Also, the contacts 294 will energize the coil of the relay 276. The solenoid-operated air valve will enable the air cylinders to move the stripper pins upwardly relative to the heated pattern on the pattern-supporting frame 22; and those pins will strip the formed and cured shell mold from that heated pattern. The operator can then manually remove that shell mold from that heated pattern.

The energization of the coil of the relay 276 will open the contacts 278 and will close the contacts 280. The opening of the contacts 278 will prevent the initiation of a succeeding cycle of the molding machine by the pressing of push button 266. The closing of the contacts 280 will establish a holding circuit for the coil of the relay 276; and that holding circuit will enable the relay 276 to keep its contacts 278 open, and thereby keep the pressing of push button 266 from initiating a further cycle of operation of the molding machine.

At this time, the timer contacts 288 will open and will de-energize the timer motor 282 and the timer clutch 284. Thereupon, the motor 282 will come to rest, and all of the timer contacts 288, 290, 292 and 294 will return to their normal, at-rest positions. Although the contacts 294 return to their normal, at-rest positions, the solenoid 308 will not become de-energized because the coil 276 continues to be energized and to hold its contacts 280 closed. The molding machine has now completed one full cycle of operation; and during that cycle of operation, the pattern-supporting frame 22 was rotated approximately three hundred and sixty degrees in the forward direction, the sand-carrying container was inverted and released a quantity of sand and binder onto the pattern, the vibrator made sure that the sand and binder conformed closely to the surface of that pattern, the pattern-supporting frame 22 remained in that position long enough to enable heat from the pattern to form the shell mold, the pattern-supporting frame 22 then rotated approximately three hundred and sixty degrees in the reverse direction, the oven 36 became heated and moved down adjacent the shell mold to help cure that shell mold, the oven 36 returned to its raised position, and the timer re-set itself. The molding machine will remain in this position, with the relay 276 still energized, until the push button 248 is pressed. This push button serves as a re-set for the molding machine; and when it is pressed it breaks the holding circuit of the coil of the relay 276, and thereupon the contacts 278 re-close and the contacts 280 re-open. At this time, all of the components of the molding machine will be in the positions which they occupied prior to the original pressing of the push button 266. To initiate another cycle of operation of the molding machine, it is only necessary for the operator to again press the push button 266; and the molding machine will then automatically pass through another cycle of operation. In doing so, that molding machine will form, cure, and then strip away another shell mold.

The switch 254 does not ordinarily affect the operation of the molding machine; being provided to prevent energization of the forward motor coil 256 solely in the event the oven 36 remains adjacent the pattern on the pattern-supporting frame 22 when it should have moved up to its raised position. In the ordinary operation of the molding machine, the solenoid 326 is de-energized by the opening of the contacts 292 prior to the end of a cycle of operation of the molding machine; and the de-energization of that solenoid should enable the spring to move the oven 36 to its raised position. However, in the event this does not happen, the switch 254 will prevent injury to the component parts of the molding machine by preventing forward rotation of the pattern-supporting frame 22 as long as the oven 36 is in its lowered position.

The push button 314 can be pressed when it is desirable to raise the stripping pins. It sometimes happens that binder and sand adhere to the ends of the stripper pins and thus interfere with the proper formation of the shell molds. At such time, it is desirable to raise the stripper pins and to hold them in raised position until the sand and binder can be removed. To effect this raising of the stripper pins, the push button 314 is pressed and is held closed. Thereupon, a circuit is closed through the solenoid 308 and a second circuit is closed through the relay 276. The relay 276 opens the circuit to the forward motor coil 256 at the contacts 278, and thereby prevents the initiation of a cycle of operation of the molding machine even if the operator accidentally presses the push button 266. The energization of the solenoid 308 will actuate the solenoid-operated air valve and enable air to pass to the air cylinders which raise the stripper pins up above the level of the pattern. Those stripper pins will remain in elevated position even after the push button 314 is released, because the relay 276 sets up a holding circuit through the contacts 280; and the contacts 280 will also keep the solenoid 308 energized. However, to return the stripper pins to their normal, retracted positions, it is only necessary to press the re-set push button 248.

The switch 318 can also be closed to secure downward movement of the oven and to secure the generation of heat by the burners 47 where a shell mold is being made which requires an unduly long curing cycle. The operator can close the switch 318 at the conclusion of the normal curing cycle of the shell mold and thereby keep the re-opening of the contacts 292 from permitting the oven 36 to move back up to its raised position. The operator can, in this way, hold the oven down adjacent the shell mold until it is completely cured.

If desired, the molding machine can be equipped with flame rods or other devices that indicate if the flame in the pattern-supporting frame 22 and if the pilot flame in the oven 36 become extinguished. However, such flame rods or other devices are not necessary.

The contacts 247, controlled by the starter coil 246, provide an interlock between the blower motor 216 and the safety shut-off valve 112; and that interlock is desirable because it prevents the movement of gas to the burners 47 and 79 until the blower 68 is operating. The pressure-responsive valves 128 and 140 also prevent the flow of gas to the burners 47 and 79 until the blower 68 is operating.

Whereas the drawing and accompanying description have shown and described a preferred embodiment of the present invention, it should be apparent to those skilled in the art that various changes may be made in the form of the invention without affecting the scope thereof.

What we claim is:

1. A mold forming machine that can form and cure shell molds and that comprises a pattern-supporting frame, an oven, a guide that guides said oven for movement toward and away from said pattern-supporting frame, a blower, a valve that is connected to a source of heating gas, a plurality of burners in said oven, a mixing device that receives air from said blower and receives heating gas from said valve, said valve being an electrically-responsive valve, a pressure-responsive valve intermediate said electrically-responsive valve and said source of heating gas, said pressure-responsive valve normally being closed but responding to a reduction in the pressure at the outlet thereof to open, said mixing device responding to the movement of air therethrough to create a reduced pressure at the outlet of said electrically-responsive valve, said electrically-responsive valve being openable to permit the movement of air through said mixing device to create a reduced pressure at the outlet of said pressure-responsive valve and thereby open said pressure-responsive valve, a conduit that connects the outlet of said mixing device to said burners to supply admixed air and heating gas, said electrically-responsive valve normally being closed, and a control device that causes said oven to move toward said pattern-supporting frame and that also causes said electrically-responsive valve to open when said oven is adjacent said pattern-supporting frame.

2. A mold forming machine comprising a pattern-supporting frame, an oven, a plurality of burners in said oven, a pilot nozzle in said oven, a guide that guides said oven for movement toward and away from said pattern-supporting frame, a blower, a flexible conduit that is connected to the outlet of said blower and to said burners in said oven to supply air to said burners, a valve that is connectable to a source of heating gas and that has the outlet thereof connected to said flexible conduit and that is openable to supply heating gas to said burners, a second flexible conduit that is connected to said outlet of said blower and to said pilot nozzle to supply air to said pilot nozzle, a second valve that is connectable to said source of heating gas and that has the outlet thereof connected to said second flexible conduit and that is openable to supply heating gas to said pilot nozzle, a source of motive power for said oven, a control element that coacts with said source of motive power to initiate movement of said oven toward said pattern-supporting frame, a second control element that coacts with the first said valve to open said first valve and thereby supply heating gas to said burners whenever said oven is adjacent said pattern-supporting frame and to close said first valve and thereby cut off said heating gas whenever said oven is spaced away from said pattern-supporting frame, said second valve being continuously open to supply heating gas to said pilot nozzle to provide a continuous pilot flame, said pilot flame igniting the heating gas issuing from said burners as the first valve opens to supply said heating gas to said burners, said air from said blower coacting with said heating gas from the first said flexible conduit to provide a curing flame whenever said oven is adjacent said pattern-supporting frame and to keep said oven cool at all other times.

3. A mold forming machine comprising a pattern-supporting frame, an oven, a plurality of burners in said oven, a pilot nozzle in said oven, a guide that guides said oven for movement toward and away from said pattern-supporting frame, a blower, a conduit that is connected to the outlet of said blower and to said burners in said oven to supply air to said burners, a valve that is connectable to a source of heating gas and that has the outlet thereof connected to said flexible conduit and that is openable to supply heating gas to said burners, a second conduit that is connected to said outlet of said blower and to said pilot nozzle to supply air to said pilot nozzle, a second valve that is connectable to said source of heating gas and that has the outlet thereof connected to said second flexible conduit and that is openable to supply heating gas to said pilot nozzle, a source of motive power for said oven, a control element that coacts with the first said valve to open said first valve and thereby supply heating gas to said burners whenever said oven is adjacent said pattern-supporting frame and to close said first valve and thereby cut off said heating gas whenever said oven is spaced away from said pattern-supporting frame, said second valve being continuously open to supply heating gas to said pilot nozzle to provide a continuous pilot flame, said pilot flame igniting the heating gas issuing from said burners as the first said valve opens to supply said heating gas to said burners, said air from said blower coacting with said heating gas from the first said flexible conduit to provide a curing flame whenever said oven is adjacent said pattern-supporting frame.

4. A mold forming machine comprising a pattern-supporting frame, an oven, a plurality of burners in said oven, an igniter in said oven, a guide that guides said oven for movement toward and away from said pattern-supporting frame, a blower, a conduit that is connected to the outlet of said blower and to said burners in said oven to supply air to said burners, a valve that is connectable to a source of heating gas and that has the outlet thereof connected to said flexible conduit and that is openable to supply heating gas to said burners, a source of motive power for said oven, a control element that coacts with said source of motive power to initiate movement of said oven toward said pattern-supporting frame, a second control element that coacts with said valve to open said valve and thereby supply heating gas to said burners whenever said oven is adjacent said pattern-supporting frame and to close said valve and thereby cut off said heating gas whenever said oven is spaced away from said pattern-supporting frame, said igniter igniting the heating gas issuing from said burners as said valve opens to supply said heating gas to said burners, said air from said blower coacting with said heating gas from said conduit to provide a curing flame whenever said oven is adjacent said pattern-supporting frame and to keep said oven cool at all other times.

5. A mold forming machine comprising a pattern-supporting frame, an oven, a plurality of burners in said oven, an igniter in said oven, a guide that guides said oven for movement toward and away from said pattern-supporting frame, a blower, a conduit that is connected to the outlet of said blower and to said burners in said oven to supply air to said burners, a valve that is connectable to a source of heating gas and that has the outlet thereof connected to said flexible conduit and that is openable to supply heating gas to said burners, said valve normally being closed and thus normally blocking the supplying of heating gas to said burners, a source of motive power for said oven, a control element that coacts with said source of motive power to initiate movement of said oven toward said pattern-supporting frame, a second control element that coacts with said valve to open said valve and thereby supply heating gas to said burners whenever said oven is adjacent said pattern-supporting frame and to close said valve and thereby cut off said heating gas whenever said oven is spaced away from said pattern-supporting frame, said igniter igniting the heating gas issuing from said burners as said valve opens to supply said heating gas to said burners, said air from said blower coacting with said heating gas from said conduit to provide a curing flame whenever said oven is adjacent said pattern-supporting frame.

6. A mold forming machine comprising a pattern-supporting frame, an oven, a plurality of burners in said oven, an igniter in said oven, a guide that guides said oven for movement toward and away from said pattern-supporting frame, a blower, a conduit that is connected to the outlet of said blower and to said burners in said oven to supply air to said burners, a valve that is connectable to a source of heating gas and that has the outlet thereof connected to said flexible conduit and that is openable to supply heating gas to said burners, a source of motive power for said oven, a control element that coacts with said source of motive power to initiate movement of said oven toward said pattern-supporting frame, a second control element that coacts with said valve to open said valve and thereby supply heating gas to said burners whenever said oven is adjacent said pattern-supporting frame and to close said valve and thereby cut off said heating gas whenever said oven is spaced away from said pattern-supporting frame, said igniter igniting the heating gas issuing from said burners as said valve opens to supply said heating gas to said burners, said air from said blower coacting with said heating gas from said conduit to provide a curing flame whenever said oven is adjacent said pattern-supporting frame, and a third control device that is manually operable and that coacts with said source of motive power to initiate movement of said oven toward said pattern-supporting frame and that coacts with said valve to supply heating gas to said burners whenever said oven is adjacent said pattern-supporting frame to provide a manually-controlled heating period.

7. A mold forming machine comprising a pattern-supporting frame, an oven, a plurality of burners in said oven, an igniter in said oven, a guide that guides said oven for movement toward and away from said pattern-supporting frame, a blower, a conduit that is connected to the outlet of said blower and to said burners in said oven to supply air to said burners, a valve that is connectable to a source of heating gas and that has the outlet thereof connected to said flexible conduit and that is openable to supply heating gas to said burners, a source of motive power for said oven, a control element that coacts with said source of motive power to initiate movement of said oven toward said pattern-supporting frame, a second control element that coacts with said valve to open said valve and thereby supply heating gas to said burners whenever said oven is adjacent said pattern-supporting frame and to close said valve and thereby cut off said heating gas whenever said oven is spaced away from said pattern-supporting frame, said igniter igniting the heating gas issuing from said burners as said valve opens to supply said heating gas to said burners, said air from said blower coacting with said heating gas from said conduit to provide a curing flame whenever said oven is adjacent said pattern-supporting frame and to keep said oven cool at all other times, said second control element coacting with said valve to start supplying heating gas to said burners shortly before said oven is moved adjacent said pattern-supporting frame.

References Cited in the file of this patent

UNITED STATES PATENTS

| | | |
|---|---|---|
| 2,668,700 | Zimmerman | Feb. 9, 1954 |
| 2,778,074 | Zimmerman | Jan. 22, 1957 |
| 2,798,265 | Rubovitz et al. | July 9, 1957 |
| 2,829,406 | Gernhardt | Apr. 8, 1958 |
| 2,838,296 | White | June 10, 1958 |
| 2,855,190 | Rieger | Oct. 7, 1958 |
| 2,899,723 | Hutchinson et al. | Aug. 18, 1959 |

FOREIGN PATENTS

| | | |
|---|---|---|
| 734,607 | Great Britain | Aug. 3, 1955 |